T. C. JOHNSON.
REAR SIGHT FOR BOLT ACTION SHOULDER ARMS.
APPLICATION FILED JULY 10, 1916.
1,220,637.
Patented Mar. 27, 1917.
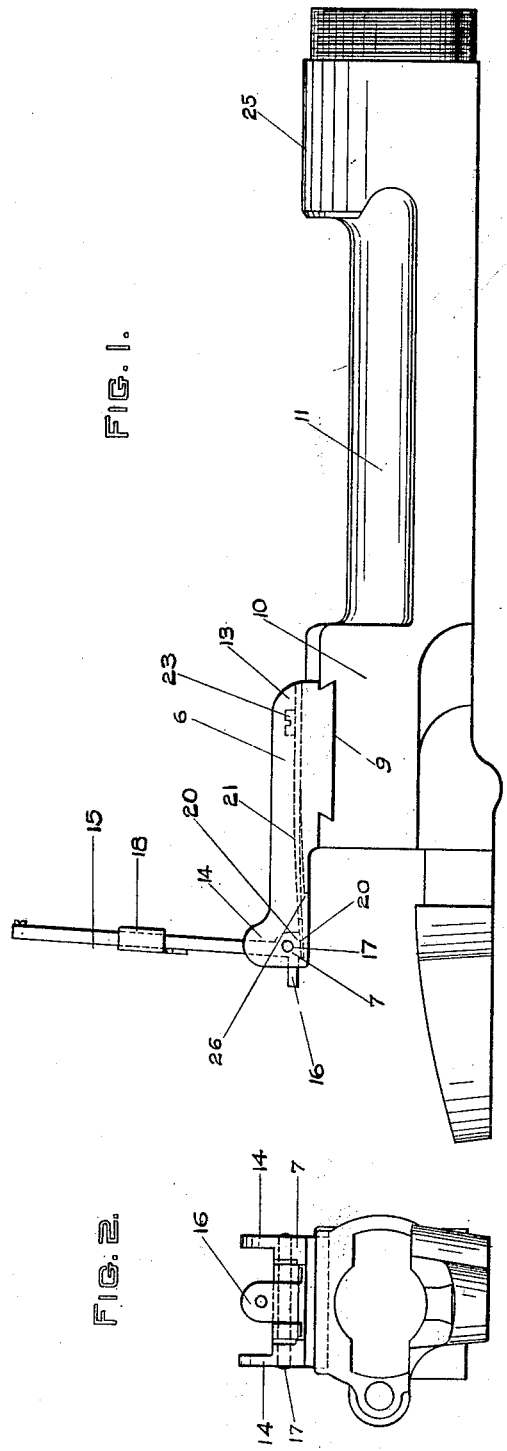
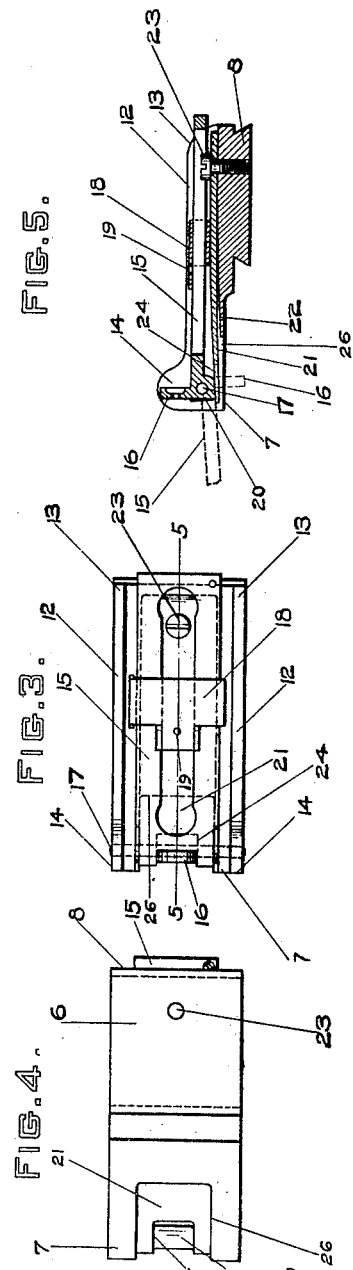
Inventor
Thomas C. Johnson
by Seymour & Earle Attys

UNITED STATES PATENT OFFICE.

THOMAS C. JOHNSON, OF NEW HAVEN, CONNECTICUT, ASSIGNOR TO WINCHESTER REPEATING ARMS CO., OF NEW HAVEN, CONNECTICUT, A CORPORATION.

REAR SIGHT FOR BOLT-ACTION SHOULDER-ARMS.

1,220,637.   Specification of Letters Patent.   Patented Mar. 27, 1917.

Application filed July 10, 1916. Serial No. 108,516.

*To all whom it may concern:*

Be it known that I, THOMAS C. JOHNSON, a citizen of the United States, residing at New Haven, in the county of New Haven and State of Connecticut, have invented a new and useful Improvement in Rear Sights for Bolt-Action Shoulder-Arms; and I do hereby declare the following, when taken in connection with the accompanying drawings and the characters of reference marked thereon, to be a full, clear, and exact description of the same, and which said drawings constitute part of this application, and represent, in—

Figure 1 a view in side elevation of a bolt-action shoulder arm receiver provided with my improved rear sight which is shown with its leaf in its elevated position.

Fig. 2 a view thereof in rear elevation with the sight in its battle-sight position.

Fig. 3 a detached plan view of the base and sight, the latter being in its battle-sight position.

Fig. 4 a reverse plan view thereof.

Fig. 5 a view thereof in longitudinal central section on the line 5—5 of Fig. 3, the sight being shown in its battle-sight position by full lines, and in its rear position by broken lines.

My invention relates to an improvement in rear-sights for bolt-action shoulder arms, the object being to produce a sight so constructed and mounted upon the rear portion of the receiver that it may be laterally adjusted thereupon and swung from front to rear in case of accident without injury to the fixed or battle-sight.

With these ends in view, my invention consists in a rear-sight for bolt-action fire-arms, having certain details of construction as will be hereinafter described and pointed out in the claims.

In carrying out my invention as herein shown, I employ a long sight-base 6 characterized by having its rear end 7 constructed and arranged to extend rearward beyond and thus overhang the rear end of the top or body-portion of the receiver 25 of a bolt-action shoulder arm. The said sight-base is secured to the receiver by a laterally arranged dovetail rib 8 formed upon the lower face of its forward end for introduction into a corresponding dovetail groove 9 formed in the upper face of the rear portion 10 of the receiver 25, the said portion 10 of the receiver being located just to the rear of the upwardly and laterally extending cartridge-charging and cartridge-ejecting opening 11 thereof. As thus mounted, the sight-base may be laterally adjusted in the groove 9 the length of which exceeds the width of the base.

Upon its upper face, the sight-base 6 is formed with parallel side flanges 12 rounded at their forward ends as at 13 and having their rear ends extended upwardly to form sight-protecting wings 14. The said flanges 12 and their upstanding wings 14 form a housing for a long slotted sight-leaf 15 formed upon the rear face of its lower end with an integral, perforated rounded projection 16 standing at a right angle to its plane and forming what is called the fixed or battle-sight. The said leaf 15 which is hung on a pivot 17 between the lower ends of the wings 14, carries a vertically adjustable elevator, so called, 18, having a sight-opening 19 and constituting a variable-range sight, the said elevator being raised and lowered on the leaf 15 to adjust the sight for different ranges. The lower end of the leaf 15 is formed with a toe 20 engaged by the rear end of a flat sight-spring 21 set into a longitudinal groove 22 in the center of the upper face of the sight-base 6 and held in place by a screw 23 passing through its forward end. The rear end of the said spring 21 is formed with a wide notch 24 for the clearance of the battle-sight 16 in case the sight-leaf is swung from front to rear through an angle of 90° from the position shown in Fig. 1 to the position shown in Fig. 5 by broken lines, as may happen in case of accident.

It will be observed by reference to Fig. 1, that when the sight-base 6 is mounted upon the portion 10 of the receiver 25, its rear end 7 forming about half its total length, overhangs the top portion of the receiver at the rear, this being done for the clearance of the battle-sight 16 in case the leaf 15 is accidentally pushed from a vertical to a horizontal position in the rearward direction. The said overhanging rear portion 7 of the sight-base 6 is formed with a large slot 26 for the clearance of the rear end of the sight spring 21 as well as for the clearance of the battle-sight 16 when swung rearward and downward as described.

In the use of the battle-sight 16, the leaf 15 is thrown forward into the horizontal position in which it is shown by full lines in Figs. 3 and 5, being retained in this position by the spring 21 and being protected therein by the parallel side flanges 12 and upstanding wings 14. In the use of the arm in variable range-shooting, the leaf 15 is lifted into its vertical position, as shown in Fig. 1, in which it is also held by the spring 21. The elevator 18 is then raised or lowered according to the desired range. Now supposing the leaf to be in its elevated position, it meets an obstruction as in case of carrying the arm through brush, it will yield against the tension of the spring 21, and move rearward and downward into the position indicated by broken lines in Fig. 5 without doing any damage to it or to the battle-sight 16 which will then move rearward and downward into the clearance notch 24 in the spring 21, and into the wide clearance slot 26 in the overhanging rear end 7 of the base 6. Of course these results could not be accomplished unless the sight-base were constructed and mounted so that its rear end overhangs the rear top portion of the receiver.

I claim:—

1. In a bolt-action shoulder arm, the combination with a receiver formed with an upwardly and laterally extending cartridge-charging and cartridge-ejecting opening, of a sight-base adapted at its forward end to be secured to the top-portion of the rear end of the said receiver at a point directly in the rear of the said opening and constructed to overhang the rear end of the said top-portion of the receiver, and a sight-leaf pivotally mounted in the said sight-base.

2. In a bolt-action shoulder arm, the combination with a receiver formed with an upwardly and laterally extending cartridge-charging and cartridge-ejecting opening, and with a transversely arranged dovetail slot located directly in the rear of the said opening, of a rear-sight base formed at its forward end with a dovetail-rib adapted to enter the said dovetail-slot and having its rear end adapted to overhang the rear end of the top-portion of the receiver, and a sight-leaf pivotally mounted in the rear end of the said base.

THOMAS C. JOHNSON.

Copies of this patent may be obtained for five cents each, by addressing the "Commissioner of Patents, Washington, D. C."